Eben J. Beane's improvement in Machines for Trimming the Heels of Boots and Shoes.
Reissued Jul 25 1871
4481
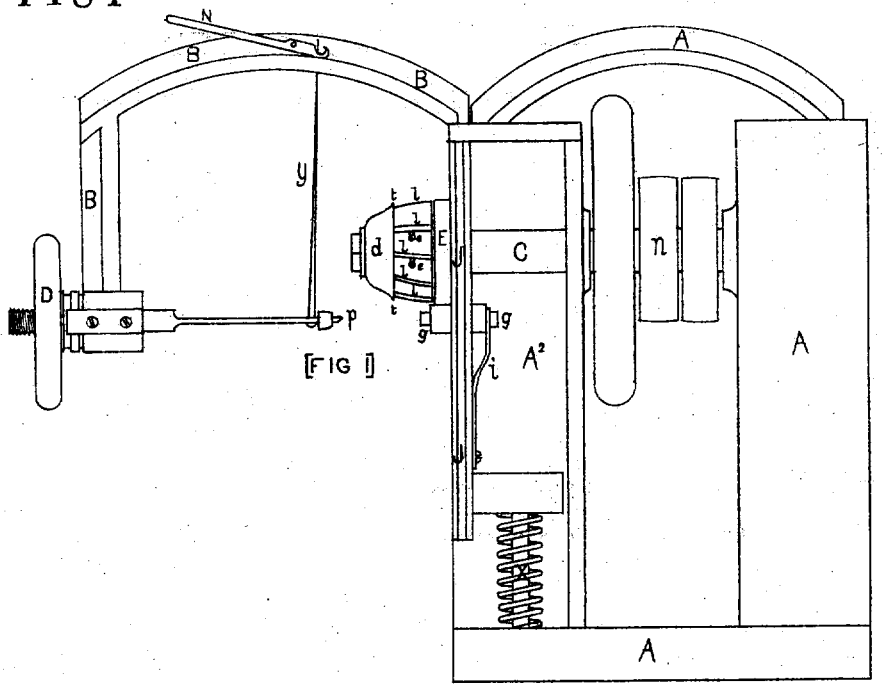
[Fig 1]
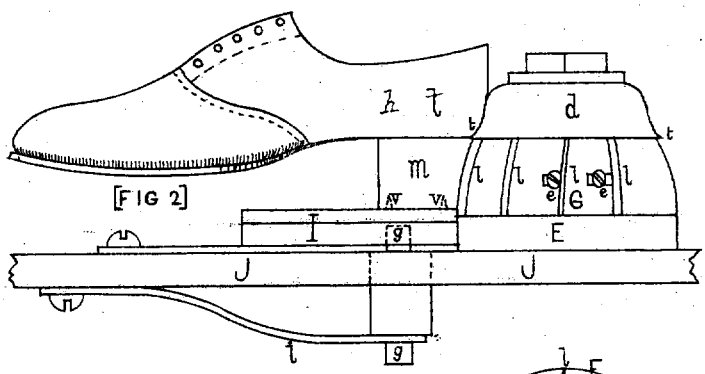
[Fig 2]
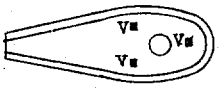
[Fig 4]
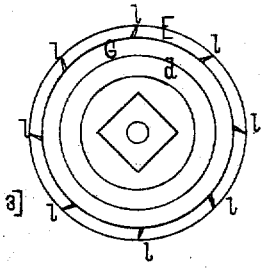
[Fig 3]
Witnesses.
Walter B. Vincent
John W. Taylor
Inventor.
Eben J. Beane
AM. PHOTO-LITHOGRAPHIC CO. N. Y. (OSBORNE'S PROCESS.)

UNITED STATES PATENT OFFICE.

EBEN J. BEANE, OF PROVIDENCE, RHODE ISLAND.

IMPROVEMENT IN BOOT AND SHOE-HEEL TRIMMING-MACHINES.

Specification forming part of Letters Patent No. 43,082, dated June 14, 1864; reissue No. 4,481, dated July 25, 1871.

*To all whom it may concern:*

Be it known that I, EBEN J. BEANE, of Providence, in the county of Providence and State of Rhode Island, have invented a new and useful Improvement in Machines for Trimming or Shaping the Heels of Boots and Shoes; and I do hereby declare that the following specification, taken in connection with the drawing making a part of the same, is a full, clear, and exact description thereof.

Figure 1 is a side elevation and section of the machine to which my improvement is to be applied. Fig. 2 represents my improvement detached from the machine. Fig. 3 is a front view of the cutter-head G detached. Fig. 4 is a view of the pattern I detached.

My invention consists in arranging with a cutter, as hereinafter described, for shaping the heels of boots and shoes a ridged or gauging-roller and a yielding center-stud, as hereinafter described.

The machine to which my improvement is directly applicable is shown in Fig. 1 of the drawing, in which A is the frame, consisting of two upright columns ascending from the bed-plate A′, in which are framed suitable bearings for the main shaft C, which is worked by means of the pulley *n* thereon. The cutter-head G is arranged on one end of the shaft C, and consists of a number of blades, *l*, of the shape necessary to give the desired form to the heel, and are firmly secured to the metal head G by screws *e e*, as shown in Fig. 2. Upon the side of the cutter-head next to the frame is fitted a loose washer or disk, E, turning freely on the main shaft, the office of which is to act in concert with a pattern-plate, I, Fig. 4, to which the boot-heel is secured, to govern the movements of the cutter-head in determining the shape of the heel. Upon the other side of the cutter-head is arranged a gauging-roller, *d*, formed with a ridge, *t*, which enters the groove between the heel *m* and the counter *h* of the boot or shoe, to determine the relative position of the cutters *l l* with the heel to be trimmed, to accommodate any variation in the height of different heels, and to trim that part of the heel which is next the counter to a thin edge. In connection with this cutter-head and roller I arrange a center-stud, *g*, upon one side thereof in a sliding plate, J, and I employ a spring, *i*, in connection with such center-pin or stud, to press it forward and give the stud a yielding action, so that when the ridge *t* of the roller *d* is in the groove between the counter and the base of the heel the center-stud may be depressed sufficiently to afford an axis for the heel to turn upon, which will adapt itself to any variation in the height of different heels. From the sliding plate J an arm, B, extends, in the end of which is formed a bearing for a centering-pin, *p*, on the end of a screw-arbor, which is advanced or withdrawn from the center-stud, when it is desirable, (in inserting or removing the shoe from the machine,) by means of the hand-wheel D, and the said centering-pin *p* is raised and depressed to adjust the heel to be trimmed to the action of the cutter by means of the hand-lever N and its connecting-rod *y*. Thus arranged, the sliding plate and the parts above described as attached thereto slide vertically in suitable guides formed in the column $A^2$ against the action of the spring X, and independently of the cutter-head G, which revolves steadily in one position, the sliding movement being produced by means of a treadle arranged beneath the machine and connected to the plate J by a rod, in such a manner that, by depressing the treadle, the heel, which is held by the center-stud *g* and centering-pin *p*, is withdrawn from the cutter-head; and when the treadle is released, the pressure of the spring X carries the heel up to the cutter-head and the pattern-plate up against the roller-disk E, when the heel revolves with the pattern-plate upon the stud *g*, and while the cutter-head is revolving rapidly the heel is trimmed smoothly to the shape of the pattern-plate. I, Figs. 2 and 4, is the pattern-plate, formed with a hole, *r*, which receives the end of the center-stud *g*, and furnished with a number of spurs, V V V, by means of which the plate is fastened to the heel to be trimmed. It will be perceived that the portion of the plate which is in contact with the bottom of the heel is narrower than the pattern portion I, which is intended to allow the cutters to be wider than the height of the heel, in order to cut the leather away clean to the face of the heel and to admit of trimming heels of various heights.

The several parts being constructed and arranged as described, the operation is that the plate I is fastened to the heel of the boot or shoe by driving the spurs V V V into the face thereof by a smart blow with a mallet. The plate is then placed on the center-stud *g* and the centering-pin *p* is screwed up against the "last" within the boot or shoe, and the center-stud *g* thereby depressed sufficiently to place the ridge *t* of the gauge-roller in the groove at the base of the heel, and give the latter the proper position relatively with the cutters *l*, which being done while the cutter-head is revolving rapidly, with the pattern-edge I of the pattern-plate bearing against the roller E, the pattern and shoe are turned on the center-stud and pin *p*, and the edge of the heel brought against the cutters, and by this means the superfluous leather is trimmed off and the heel is brought to its proper shape, whether it be a trifle higher or lower, the yielding of the center-stud *g* accommodating any usual variation in that respect.

I am aware that a similar arrangement of a heel-plate, centering-pin, and rotary cutter has been previously patented, but without being combined with the equivalent of the ridged gauging-roller *d*, and without any yielding movement of the center-stud, which are the distinguishing features of my improvement, and the means by which I am enabled to do a greater variety of work on the same machine, and to turn the heel so smoothly and completely as to require no further finishing by hand, as in the case of the arrangement referred to.

What I claim as my invention, and desire to secure by Letters Patent, is—

1. The combination of a cutter, substantially as described, with a ridged or gauging-roller, *d*, and a yielding center-stud, *g*, substantially as described, for the purpose specified.

2. The combination of the rotating cutter G with the gauging-roller *d* and the movable pattern-plate I, substantially as and for the purpose herein set forth.

3. The combination of the rotating cutter with the gauging-roller *d*, the pattern-plate I, the center-stud *g*, and the centering-pin *p*, substantially as and for the purpose herein set forth.

Witnesses: EBEN J. BEANE.

WALTER B. VINCENT,

JOHN D'W. TAYLOR.